United States Patent
Suzuki et al.

(10) Patent No.: US 8,072,702 B2
(45) Date of Patent: *Dec. 6, 2011

(54) ATMOSPHERIC PRESSURE MEASURING APPARATUS AND METHOD OF MEASURING ATMOSPHERIC PRESSURE

(75) Inventors: Yoshitaka Suzuki, Kawasaki (JP); Takahiro Imamura, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 372 days.

This patent is subject to a terminal disclaimer.

(21) Appl. No.: 12/362,530

(22) Filed: Jan. 30, 2009

(65) Prior Publication Data

US 2009/0196129 A1 Aug. 6, 2009

(30) Foreign Application Priority Data

Jan. 31, 2008 (JP) ................... 2008-021462

(51) Int. Cl.
*G11B 21/02* (2006.01)
*G01L 11/00* (2006.01)

(52) U.S. Cl. ........................................... 360/75; 73/702
(58) Field of Classification Search ....................... None
See application file for complete search history.

(56) References Cited

U.S. PATENT DOCUMENTS

| | | | |
|---|---|---|---|
| 6,615,663 B2 * | 9/2003 | Kenney et al. | 73/632 |
| 7,048,697 B1 | 5/2006 | Mitsuru | |
| 2009/0184830 A1 * | 7/2009 | Watabe et al. | 340/628 |

FOREIGN PATENT DOCUMENTS

| | | |
|---|---|---|
| JP | 2001-276019 | 10/2001 |
| JP | 3242631 | 10/2001 |

* cited by examiner

*Primary Examiner* — Daniell L Negron
(74) *Attorney, Agent, or Firm* — Greer, Burns & Crain, Ltd.

(57) ABSTRACT

An atmospheric pressure measuring apparatus allows a transmitter to transmit an acoustic wave for measurement of the atmospheric pressure. Air propagates the acoustic wave. A receiver receives the acoustic wave. Since the intensity of the acoustic wave changes to follow the variation of the atmospheric pressure, the atmospheric pressure can be measured based on the intensity of the acoustic wave received at the receiver. The atmospheric pressure is in this manner measured with such a simplified structure.

5 Claims, 8 Drawing Sheets

ATMOSPHERIC PRESSURE MEASURING APPARATUS AND METHOD OF MEASURING ATMOSPHERIC PRESSURE

BACKGROUND OF THE INVENTION

1. Field of the Invention

The present invention relates to an atmospheric pressure measuring apparatus and a method of measuring an atmospheric pressure.

2. Description of the Prior Art

An atmospheric pressure measuring apparatus includes a closed cavity with a deformable wall for detection of the absolute pressure. A sensor is placed in contact with the wall of the closed cavity. The closed cavity contains a predetermined amount of gas to hold a reference pressure therein. A variation in the atmospheric pressure around the closed cavity induces a variation in the volume of the closed cavity. The sensor is thus designed to detect the variation in the volume by sensing either the deformation or stress or strain on the wall of the closed cavity. The atmospheric pressure measuring apparatus enables detection of the atmospheric pressure based on a variation in the volume of the closed cavity.

The pressure inside the closed cavity is kept constant level so as to ensure the accuracy of detection of the atmospheric pressure in the atmospheric pressure measuring apparatus of this type. Pressure is always applied to the sensor. Accordingly, the sensor may suffer from generation of so-called creep. This results in deterioration of the accuracy of detection. A conventional atmospheric pressure measuring apparatus has another drawback. The wall of the closed cavity is required to have a reduced thickness so that the wall of the closed cavity deforms in response to the application of pressure. This makes the atmospheric pressure measuring apparatus fragile. Moreover, it is quite necessary to completely seal the closed cavity so as to keep the pressure constant. A high processing technique is required to produce the closed cavity.

SUMMARY OF THE INVENTION

It is accordingly an object of the present invention to provide an atmospheric pressure measuring apparatus capable of detecting the atmospheric pressure with a simplified structure. It is an object of the present invention to provide a method of detecting the atmospheric pressure in a facilitated manner.

According to a first aspect of the present invention, there is provided an atmospheric pressure measuring apparatus comprising: a transmitter designed to transmit an acoustic wave; a receiver designed to receive the acoustic wave transmitted from the transmitter; and a controlling section designed to detect an atmospheric pressure based on the intensity of the acoustic wave received at the receiver.

The atmospheric pressure measuring apparatus allows the transmitter to transmit an acoustic wave for measurement of the atmospheric pressure. Air propagates the acoustic wave. The receiver receives the acoustic wave. Since the intensity of the acoustic wave changes to follow the variation of the atmospheric pressure, the atmospheric pressure can be measured based on the intensity of the acoustic wave received at the receiver. The atmospheric pressure is in this manner measured with such a simplified structure. The atmospheric pressure measuring apparatus preferably allows the transmitter and the receiver to be opposed to each other at a distance.

The transmitter is designed to convert an electric signal to an acoustic wave in the atmospheric pressure measuring apparatus. The receiver is designed to convert an acoustic wave into an electric signal. In this case, the receiver may include a filtering circuit designed to eliminate the noise of the electric signal depending on the frequency of the acoustic wave transmitted from the transmitter. The noise of the electric signal is eliminated through the filtering circuit. The intensity of the acoustic wave is thus measured with a higher accuracy.

The controlling section detects the atmospheric pressure in accordance with the relationship between atmospheric pressure and the ratio of the intensity of the acoustic wave, received at the receiver, to the intensity of the acoustic wave transmitted from the transmitter. When such a relationship is in this manner specified between the acoustic wave and the atmospheric pressure, the atmospheric pressure can be determined in a facilitated manner. The relationship may be established beforehand based on an actual measurement.

The frequency of the acoustic wave is preferably set equal to the resonant frequency of at least one of the transmitter and the receiver. The resonance of the receiver serves to increase the electric signal output from the receiver. The transmitter and the receiver are preferably spaced from each other at a distance equal to the half wavelength, of the acoustic wave transmitted from the transmitter, multiplied by an integer. This type of location enables establishment of the resonance at the receiver. The resonance of the receiver serves to increase to the utmost the electric signal output from the receiver. In particular, the frequency of the acoustic wave is preferably set in a range out of the audio frequency. Generation of noise is in this manner prevented in the atmospheric pressure measuring apparatus.

The transmitter and the receiver may each include: a diaphragm; and a piezoelectric material bonded to the diaphragm. A piezoelectric buzzer can be employed as the transmitter and the receiver. The structure of the atmospheric pressure measuring apparatus can thus be simplified. The diaphragm of the transmitter and the diaphragm of the receiver are identical in shape and dimension.

According to a second aspect of the present invention, there is provided a method of measuring the atmospheric pressure, comprising: transmitting an acoustic wave from a transmitter; receiving the acoustic wave transmitted from the transmitter at a receiver; and detecting the atmospheric pressure based on the intensity of the acoustic wave received at the receiver.

The method allows the transmitter to transmit an acoustic wave for measurement of the atmospheric pressure. Air propagates the acoustic wave. The receiver receives the acoustic wave. Since the intensity of the acoustic wave changes to follow the variation of the atmospheric pressure, the atmospheric pressure can be measured based on the intensity of the acoustic wave received at the receiver. The atmospheric pressure is in this manner measured with such a simplified structure.

The transmitter is designed to convert an electric signal to an acoustic wave upon transmission of an acoustic wave in the method. The receiver is designed to convert an acoustic wave into an electric signal upon reception of the acoustic wave. The method may further comprise eliminating the noise of the electric signal depending on the frequency of the acoustic wave transmitted from the transmitter. The intensity of the acoustic wave is thus detected with a higher accuracy.

The atmospheric pressure is detected in accordance with the relationship between atmospheric pressure and the ratio of the intensity of the acoustic wave, received at the receiver, to the intensity of the acoustic wave transmitted from the transmitter. When such a relationship is in this manner specified between the acoustic wave and the atmospheric pressure, the atmospheric pressure can be determined in a facilitated manner. The relationship may be established beforehand based on an actual measurement.

The frequency of the acoustic wave is preferably set equal to the resonant frequency of at least one of the transmitter and the receiver. The resonance of the receiver serves to increase the electric signal output from the receiver. The transmitter and the receiver are preferably opposed to each other at a distance equal to the half wavelength, of the acoustic wave transmitted from the transmitter, multiplied by an integer. This type of location enables establishment of the resonance at the receiver. The resonance of the receiver serves to increase to the utmost the electric signal output from the receiver. In particular, the frequency of the acoustic wave is preferably set in a range out of the audio frequency. Generation of noise is in this manner prevented in the method.

According to a third aspect of the present invention, there is provided a storage device comprising: an enclosure; a storage medium incorporated in the inner space of the enclosure; a head slider opposed to the surface of the storage medium at a distance; a head element mounted on the head slider; a transmitter incorporated in the inner space of the enclosure, the transmitter designed to transmit an acoustic wave; a receiver incorporated in the inner space of the enclosure, the receiver designed to receive the acoustic wave transmitted from the transmitter; and a controlling section designed to detect the atmospheric pressure based on the intensity of the acoustic wave received at the receiver, the controlling section designed to control the flying height of the head element in accordance with the detected atmospheric pressure.

The storage device allows the transmitter to transmit an acoustic wave for measurement of the atmospheric pressure in the same manner as described above. Air propagates the acoustic wave. The receiver receives the acoustic wave. Since the intensity of the acoustic wave changes to follow the variation of the atmospheric pressure, the atmospheric pressure can be measured based on the intensity of the acoustic wave received at the receiver. The atmospheric pressure is in this manner measured with such a simplified structure. Moreover, a variation in the flying height of the head element can be measured based on the detected atmospheric pressure. The flying height of the head element can be adjusted in accordance with the detected variation in the flying height. The flying height of the head element is in this manner kept constant irrespective of the variation of the atmospheric pressure. Magnetic bit data can be read out of/written into the storage medium with accuracy. Otherwise, the storage device includes the structure identical to the structure of the aforementioned atmospheric pressure measuring apparatus.

The controlling section adjusts the revolution speed of the storage medium for controlling the flying height of the head element above the storage medium. When the revolution speed increases, for example, the current of the airflow generated along the surface of the storage medium increases. The head slider is allowed to enjoy an increased positive pressure acting on the head slider. On the contrary, when the revolution speed of the storage medium decreases, the current of the airflow decreases. The head slider is thus allowed to enjoy a reduced positive pressure acting on the head slider. The adjustment of the revolution speed in this manner realizes the adjustment of the flying height of the head element.

According to a fourth aspect of the present invention, there is provided a method of controlling a flying height, comprising: transmitting an acoustic wave from a transmitter incorporated in the inner space of an enclosure of a storage device; receiving the acoustic wave transmitted from the transmitter at a receiver incorporated in the inner space of the enclosure; detecting the atmospheric pressure inside the enclosure based on the intensity of the acoustic wave received at the receiver; and adjusting the flying height of a head element mounted on a head slider above a storage medium in accordance with the detected atmospheric pressure. Otherwise, the method includes the features identical to the features of the aforementioned method of measuring the atmospheric pressure.

The method allows the transmitter to transmit an acoustic wave for measurement of the atmospheric pressure in the same manner as described above. Air propagates the acoustic wave. The receiver receives the acoustic wave. Since the intensity of the acoustic wave changes to follow the variation of the atmospheric pressure, the atmospheric pressure can be measured based on the intensity of the acoustic wave received at the receiver. The atmospheric pressure is in this manner measured with such a simplified structure. Moreover, a variation in the flying height of the head element can be measured based on the detected atmospheric pressure. The flying height of the head element can be adjusted in accordance with the detected variation in the flying height. The flying height of the head element is in this manner kept constant irrespective of the variation of the atmospheric pressure. Magnetic bit data can be read out of/written into the storage medium with accuracy.

A protrusion may be formed on the head slider based on the thermal expansion for controlling the flying height of the head element. Alternatively, the revolution speed of the storage medium may be adjusted for controlling the flying height of the head element.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
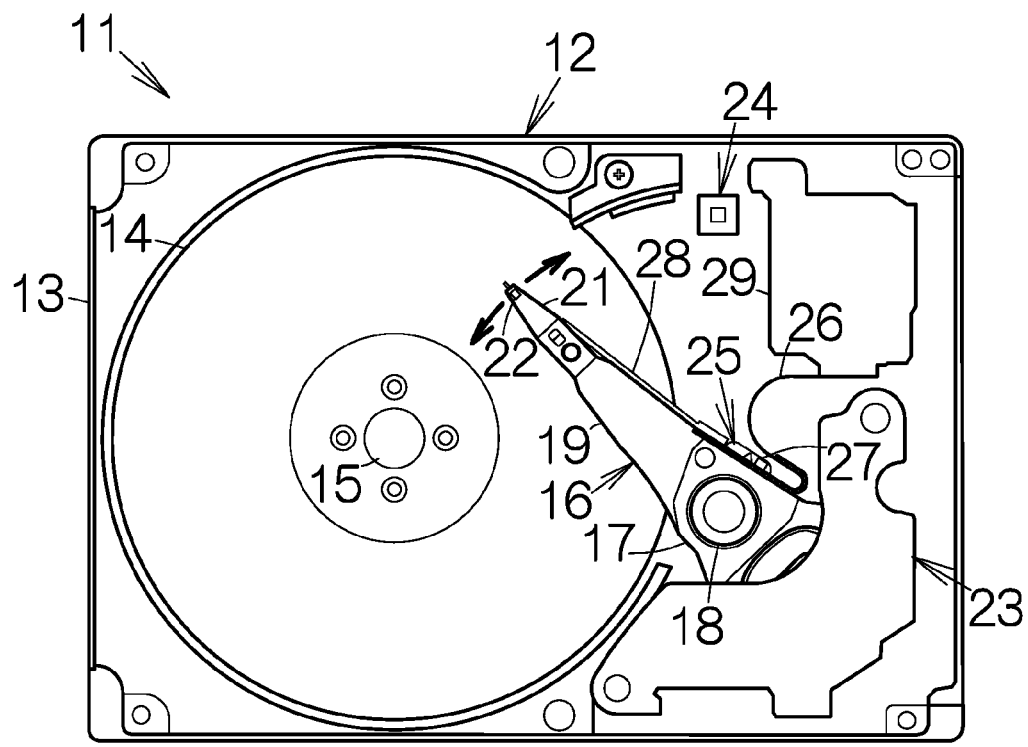
FIG. 1 is a plan view schematically illustrating the inner structure of a hard disk drive as a specific example of a storage device according to the present invention.

FIG. 1 schematically illustrates the inner structure of a hard disk drive, HDD, 11 as an example of a storage medium drive or storage device. The hard disk drive 11 includes an enclosure 12. The enclosure 12 includes an box-shaped enclosure base 13 and an enclosure cover, not shown. The boxed-shaped enclosure base 13 defines an inner space of a flat parallelepiped, for example. The enclosure base 13 may be made of a metallic material such as aluminum, for example. Molding process may be employed to form the enclosure base 13. The enclosure cover is coupled to the enclosure base 13. The enclosure cover serves to close the opening of the inner space of the enclosure base 13. Pressing process may be employed to form the enclosure cover out of a plate material, for example.

At least one magnetic recording disk 14 as a recording medium is incorporated within the inner space of the enclosure base 13. The magnetic recording disk or disks 14 is mounted on the driving shaft of a spindle motor 15. The spindle motor 15 drives the magnetic recording disk or disks 14 at a higher revolution speed such as 4,200 rpm, 5,400 rpm, 7,200 rpm, 10,000 rpm, 15,000 rpm, or the like.

A carriage 16 is also incorporated in the inner space of the enclosure base 13. The carriage 16 includes a carriage block 17. The carriage block 17 is supported on a vertical support shaft 18 for relative rotation. Carriage arms 19 are defined in the carriage block 17. The carriage arms 19 are designed to extend in a horizontal direction from the vertical support shaft 18. The carriage block 17 may be made of aluminum, for example. Extrusion process may be employed to form the carriage block 17, for example.

A head suspension 21 is attached to the front or tip end of the individual carriage arm 19. The head suspension 21 is designed to extend forward from the carriage arm 19. A flexure is attached to the head suspension 21. A so-called gimbal is defined in the flexure. A flying head slider 22 is supported on the gimbal. The gimbal allows the flying head slider 22 to change its attitude relative to the head suspension 21. A head element or electromagnetic transducer is mounted on the flying head slider 22.

When the magnetic recording disk 14 rotates, the flying head slider 22 is allowed to receive an airflow generated along the rotating magnetic recording disk 14. The airflow serves to generate a positive pressure or a lift as well as a negative pressure on the flying head slider 22. The flying head slider 22 is thus allowed to keep flying above the surface of the magnetic recording disk 14 during the rotation of the magnetic recording disk 14 at a higher stability established by the balance between the urging force of the head suspension 21 and the combination of the lift and the negative pressure.

When the carriage 16 swings around the vertical support shaft 18 during the flight of the flying head slider 22, the flying head slider 22 is allowed to move along an arc defined approximately along the radial direction of the magnetic recording disk 14. The electromagnetic transducer on the flying head slider 22 is thus allowed to cross the data zone defined between the innermost and outermost recording tracks. The electromagnetic transducer on the flying head slider 22 is positioned right above a target recording track on the magnetic recording disk 14.

A power source such as a voice coil motor, VCM, 23 is coupled to the carriage block 17. The voice coil motor 23 serves to drive the carriage block 17 around the vertical support shaft 18. The rotation of the carriage block 17 allows the carriage arms 19 and the head suspensions 21 to swing.

An atmospheric pressure measuring apparatus or atmospheric pressure sensor 24 is located on the bottom plate of the enclosure base 13 at a position outside the movement range of the carriage arms 19 and the head suspensions 21. A screw, not shown, may be utilized to fix the atmospheric pressure sensor 24 to the bottom plate of the enclosure base 13, for example. The atmospheric pressure sensor 24 is designed to detect the atmospheric pressure in the inner space of the enclosure base 13. Description will be made on the atmospheric pressure sensor 24 later in detail.

As is apparent from FIG. 1, a flexible printed circuit board, FPC, unit 25 is located on the actuator block 17. The flexible printed circuit board unit 25 includes a head IC (integrated circuit) 27 mounted on a flexible printed wiring board 26. The head IC 27 is connected to the read head element and the write head element of the electromagnetic transducer. A flexure 28 is utilized for such connections. The flexure 28 includes a long tail connected to the flexible printed circuit board unit 25. The flexure 28 includes a wiring pattern. The conductive pads on the flying head slider 22 are connected to the wiring pattern on the flexible printed wiring board 26 through the wiring pattern on the flexure 28.

The head IC 27 is designed to supply the read head element of the electromagnetic transducer with a sensing current when magnetic bit data is to be read. The read head element is a current-perpendicular-to-plane (CPP), for example. The head IC 27 is also designed to supply the write head element of the electromagnetic transducer with a writing current when magnetic bit data is to be written. A write head element is a single-pole head element, for example. The value of the sensing current is set at a specific value. A small-sized circuit board 29 is located within the inner space of the enclosure base 13. The head IC 27 is designed to receive the sensing and writing currents from the circuit board 29, a printed circuit board, not shown, attached to the back surface of the bottom plate of the enclosure base 13, and the like.

Figure 2:
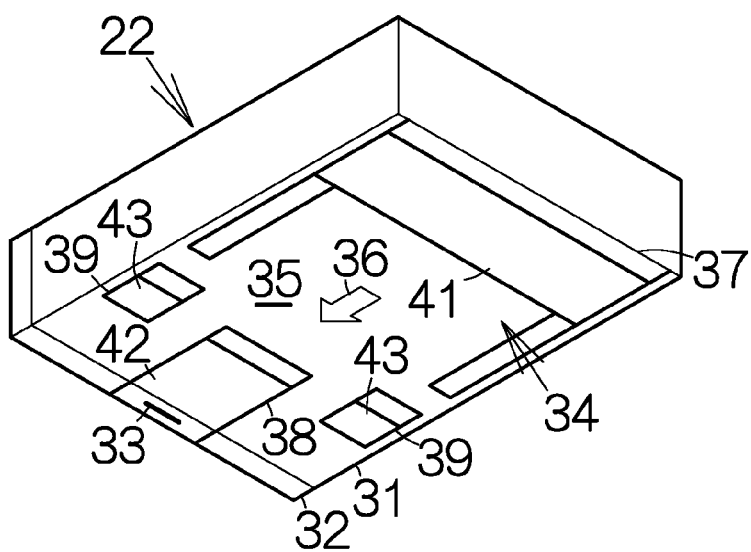
FIG. 2 is an enlarged perspective view schematically illustrating a flying head slider.

FIG. 2 illustrates a specific example of the flying head slider 22 according to an embodiment of the present invention. The flying head slider 22 includes a slider body 31 in the form of a flat parallelepiped, for example. An insulating non-magnetic film, namely a head protection film 32, is overlaid on the outflow or trailing end surface of the slider body 31. An electromagnetic transducer 33 is incorporated in the head protection film 32. The slider body 31 may be made of a hard material such as $Al_2O_3$-TiC. The head protection film 32 may be made of a relatively soft material such as $Al_2O_3$ (alumina).

A medium-opposed surface or bottom surface 34 is defined over the slider body 31 so as to face the magnetic recording disk 14 at a distance. A flat base surface 35 as a reference surface is defined on the bottom surface 34. When the magnetic recording disk 14 rotates, airflow 36 flows along the bottom surface 34 from the inflow or front end toward the outflow or rear end of the slider body 31.

A front rail 37 is formed on the bottom surface 34 of the slider body 31. The front rail 37 stands upright from the base surface 35 of the bottom surface 34 near the inflow end of the slider body 31. The front rail 37 is designed to extend along the inflow end of the base surface 35 in the lateral direction of the slider body 31. A rear rail 38 is likewise formed on the bottom surface 34 of the slider body 31. The rear rail 38 stands upright from the base surface 35 of the bottom surface 34 near the outflow end of the slider body 31. The rear rail 38 is located at the intermediate position in the lateral direction of the slider body 31. The rear rail 38 is designed to extend over the head protection film 32.

A pair of rear side rails 39, 39 is likewise formed on the bottom surface 34 of the slider body 31. The rear side rails 39, 39 stand upright from the base surface 35 of the bottom surface 34 near the outflow end of the slider body 31. The rear side rails 39, 39 are located along the sides of the slider body 31, respectively. The rear side rails 39, 39 are thus distanced from each other in the lateral direction of the slider body 31. The rear rail 38 is located in a space between the rear side rails 39, 39.

Air bearing surfaces 41, 42, 43 are defined on the top surfaces of the front, rear and rear side rails 37, 38, 39, respectively. Steps connect the inflow ends of the air bearing surfaces 41, 42, 43 to the top surfaces of the rails 37, 38, 39, respectively. The bottom surface 34 of the flying head slider 22 is designed to receive the airflow 36 generated along the rotating magnetic recording disk 14. The steps serve to generate a larger positive pressure or lift at the air bearing surfaces 41, 42, 43, respectively. Moreover, a larger negative pressure is generated behind the front rail 37 or at a position downstream of the front rail 37. The negative pressure is balanced with the lift so as to stably establish the flying attitude of the flying head slider 22. It should be noted that the flying head slider 22 can take any shape or form different from the described one.

Figure 3:
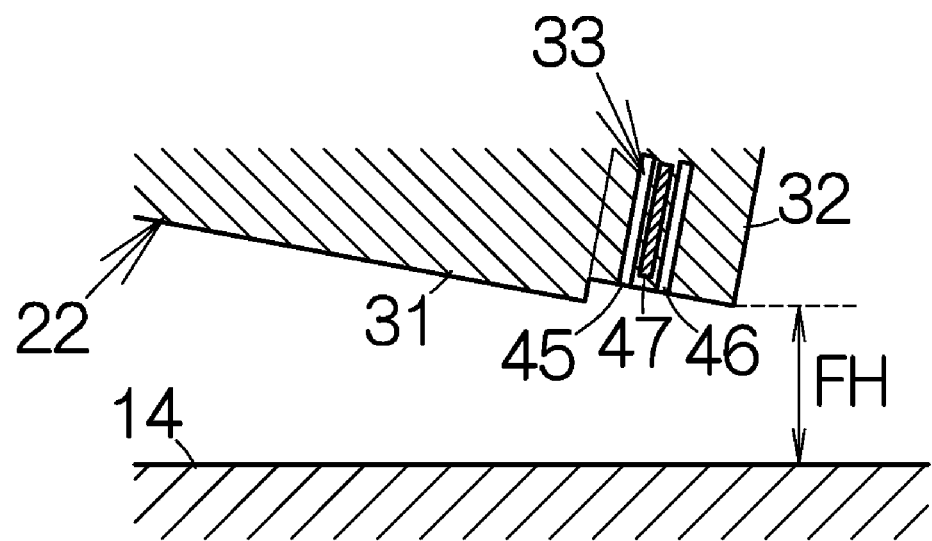
FIG. 3 is an enlarged partial sectional view schematically illustrating an electromagnetic transducer.
Figure 4:
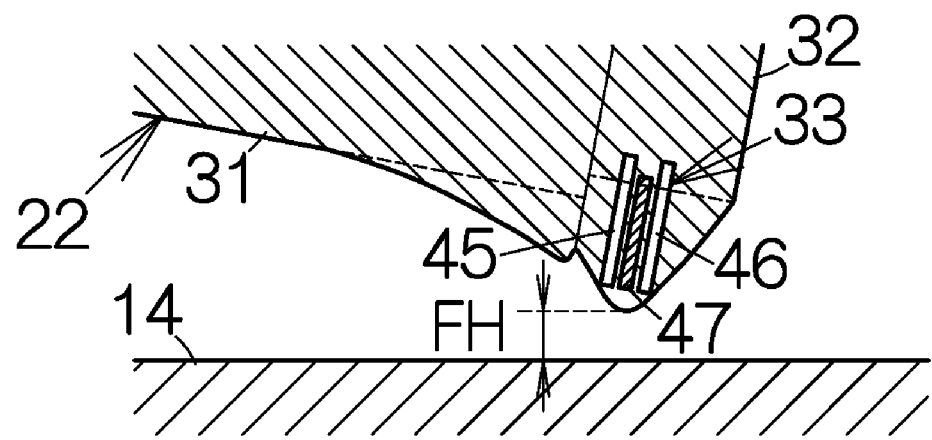
FIG. 4 is an enlarged partial sectional view schematically illustrating a protrusion formed on the flying head slider.

As shown in FIG. 3, the electromagnetic transducer 33 includes a read head element 45 and a write head element 46. A heater 47 is incorporated at a position between the read head element 45 and the write head element 46. The heater 47 includes a heating wiring pattern, for example. When electric power is supplied to the heater 47, the heater 47 generates heat. The generated heat causes the thermal expansion of not only the heater 47 but also the read head element 45, the write head element 46 and the head protection film 32. The head protection film 32 and the slider body 31 thus protrude on the top surface of the rear rail 38, as shown in FIG. 4. This results in formation of a so-called protrusion. The read head element 45 and the write head element 46 thus get closer to the magnetic recording disk 14. The flying amount or flying height FH of the electromagnetic transducer 33 is in this manner determined.

Figure 5:
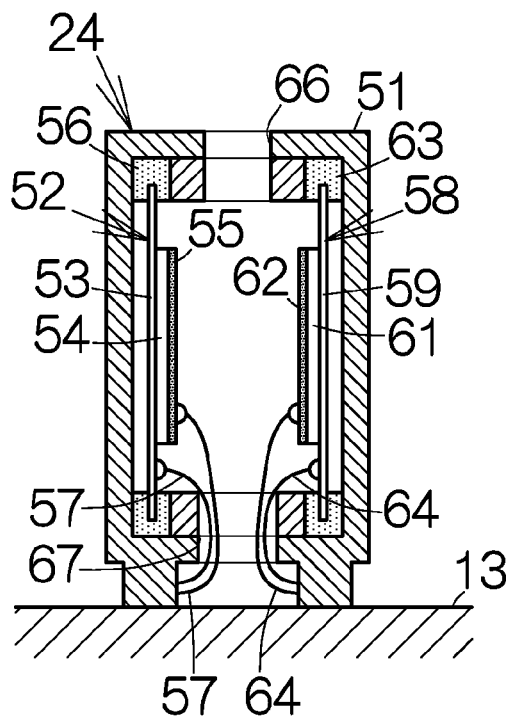
FIG. 5 is a sectional view schematically illustrating an atmospheric pressure measuring apparatus according to an embodiment of the present invention.

FIG. 5 schematically illustrates the structure of the atmospheric pressure sensor 24 according to an embodiment of the present invention. The atmospheric pressure sensor 24 includes a casing 51 defining an inner space of a parallelepiped, for example. The casing 51 is made of a resin material, for example. A transmitter or speaker 52 is placed in the inner space of the casing 51. The speaker 52 includes a diaphragm 53 and a piezoelectric material 54. The back surface of the piezoelectric material 54 is superposed on and bonded to the front surface of the diaphragm 53. The back surface of the diaphragm 53 is opposed to the side wall of the casing 51 at a distance. A metal plate such as a brass plate, a stainless steel plate, or the like, is employed as the diaphragm 53. A piezoelectric ceramic thin film is employed as the piezoelectric material 54, for example. An electrode 55 is overlaid all over the front surface of the piezoelectric material 54. The diaphragm 53 is supported on a vibration absorbing material 56. The diaphragm 53 may be supported on the vibration absorbing material 56 over its entire outer periphery. The vibration absorbing material 56 is fixed to the inside wall surface of the casing 51.

Wires 57, 57 are connected to the diaphragm 53 and the electrode 55, respectively. A predetermined electric signal, namely alternating voltage, is applied to the piezoelectric material 54 through the wires 57. The shrinkage/elongation of the piezoelectric material 54 occurs in response to the application of the alternating voltage. The shrinkage/elongation of the piezoelectric material 54 induces the vibration of the diaphragm 53. An acoustic wave is transmitted from the speaker 52 in response to the vibration of the diaphragm 53. The frequency of the alternating voltage determines the frequency of the acoustic wave. Since the diaphragm 53 is supported on the vibration absorbing material 56 as described above, the casing 51 is prevented to the utmost from the reception of the vibration from the diaphragm 53.

A receiver or microphone 58 is also placed in the inner space of the casing 51. The microphone 58 is opposed to the speaker 52 at a predetermined distance. The microphone 58 includes a diaphragm 59 and a piezoelectric material 61. The back surface of the piezoelectric material 61 is superposed on and bonded to the front surface of the diaphragm 59. The front surface of the diaphragm 59 is opposed to the front surface of the diaphragm 53. The diaphragm 59 extends in parallel with the diaphragm 53. The back surface of the diaphragm 59 is opposed to the side wall of the casing 51 at a distance. A metal plate such as a brass plate, a stainless steel plate, or the like, is employed as the diaphragm 59. A piezoelectric ceramic thin film is employed as the piezoelectric material 61, for example. An electrode 62 is overlaid all over the front surface of the piezoelectric material 61. The diaphragm 59 is supported on a vibration absorbing material 63. The diaphragm 59 may be supported on the vibration absorbing material 63 over its entire outer periphery. The vibration absorbing material 63 is fixed to the inside wall surface of the casing 51.

Wirings 64, 64 are connected to the diaphragm 59 and the electrode 62, respectively. Atmospheric air serves to propagate the acoustic wave from the speaker 52 to the microphone 58. The diaphragm 59 vibrates in response to reception of the acoustic wave. The vibration of the diaphragm 59 induces the shrinkage/elongation of the piezoelectric material 61. An electric signal or alternating voltage is generated in the piezoelectric material 61. The generated alternating voltage is taken out through the wires 64. Since the diaphragm 59 is supported on the vibration absorbing material 63 as described above, the casing 51 is prevented to the utmost from the reception of the vibration from the diaphragm 59.

Figure 6:
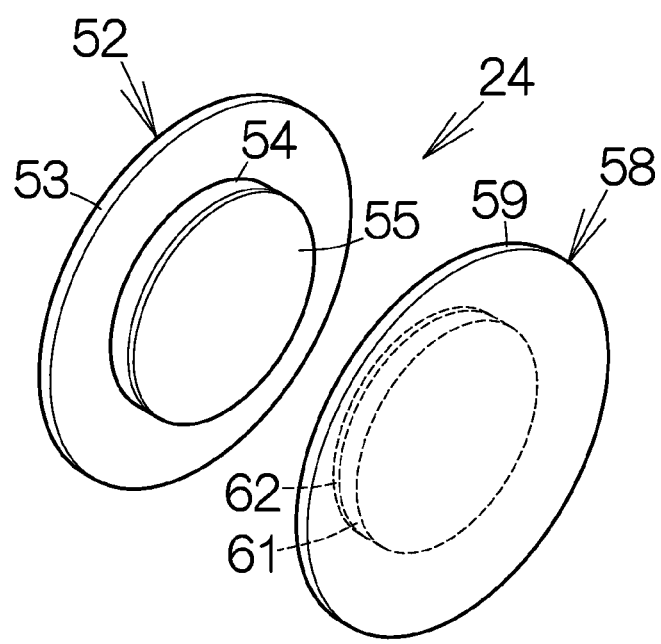
FIG. 6 is a perspective view schematically illustrating the structure of a transmitter and a receiver.

Ventilation openings 66, 67 are defined in the top plate and the bottom plate of the casing 51, respectively. The inner space of the casing 51 is connected to the outer space of the casing 51, namely the inner space of the enclosure 12, through the ventilation openings 66, 67. The air in the enclosure 12 is introduced into the inner space of the casing 51 through the ventilation openings 66, 67. Referring also to FIG. 6, the diaphragms 53, 59, the piezoelectric materials 54, 61 and the electrodes 55, 62 are each formed in the shape of a disk. The central axis of the diaphragm 53, corresponding to the center of speaker 52 is aligned with the central axis of the diaphragm 59, corresponding to the center of the microphone 58, for example. Here, the diaphragm 53 of the speaker 52 and the diaphragm 59 of the microphone 58 are identical in shape and dimension. Likewise, the piezoelectric materials 54, 61 are identical in shape and dimension. A so-called piezoelectric buzzer may be employed as the speaker 52 and the microphone 58.

Here, the speaker 52 is preferably designed to transmit the acoustic wave out of the audio frequency. This serves to reliably prevent generation of noise in the hard disk drive 11. In particular, the speaker 52 is preferably designed to transmit the acoustic wave having a frequency equal to the resonant frequency of the speaker 52 and the microphone 58. This results in an increase in the output of the alternating voltage taken out from the microphone 58. It is accordingly possible to reduce the amplitude of the alternating voltage applied to the speaker 52. In addition, the speaker 52 and the microphone 58 are spaced from each other by a distance equal to the half wavelength, of the acoustic wave transmitted from the speaker 52, multiplied by an integer. This results in generation of resonance between the diaphragms 53, 59. Even if the output of the microphone 58 is relatively small, the resonance serves to amplify the output of the alternating voltage at the microphone 58.

Figure 7:
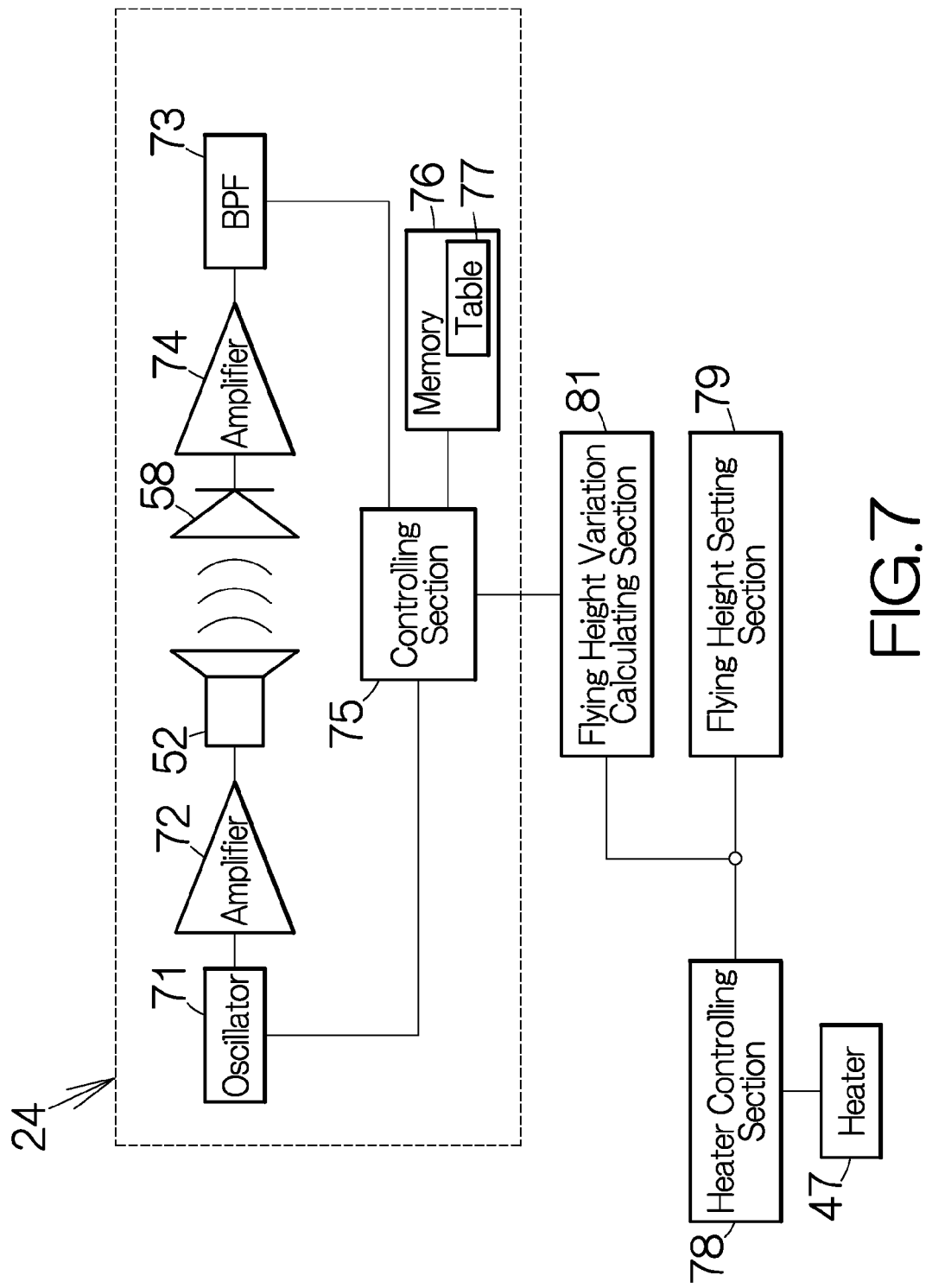
FIG. 7 is a block diagram illustrating a controlling system according to a specific embodiment.

As shown in FIG. 7, the atmospheric pressure sensor 24 includes an oscillator 71. The oscillator 71 is connected to the speaker 52. A predetermined alternating voltage is applied to the speaker 52 from the oscillator 71. An amplifier 72 is interposed between the oscillator 71 and the speaker 52. The amplifier 72 serves to amplify the alternating voltage. A filtering circuit, namely a band-pass filter 73, is connected to the microphone 58. The band-pass filter 73 serves to eliminate the noise included in the alternating voltage output from the microphone 58. The band-pass filter 73 serve to cut off frequency off or not equal to the frequency of the acoustic wave transmitted from the speaker 52. An amplifier 74 is interposed between the microphone 58 and the band-pass filter 73. The amplifier 74 serves to amplify the output of the alternating voltage.

In general, a reduction in the atmospheric pressure in the inner space of the enclosure 12, namely of the inner space of the casing 51, results in a reduction in the air density of the inner space of the casing 51. This causes a reduction in the intensity of the transmitted acoustic wave. On the other hand, an increase in the atmospheric pressure in the inner space of the casing 51 results in an increase in the air density of the inner space of the casing 51. This causes a gain in the intensity of the transmitted acoustic wave. The intensity of the acoustic wave can in this manner be utilized to measure the atmospheric pressure inside the enclosure 12 as described later in detail.

A controlling section 75 is connected to the band-pass filter 73. The alternating voltage after filtering is supplied to the controlling section 75 from the band-pass filter 73. The controlling section 75 is also connected to the aforementioned amplifier 71. The controlling section 75 is designed to control the oscillator 71 for the application of the alternating voltage. The oscillator 71 serves to apply the alternating voltage to the speaker 52 in response to the instructions from the controlling section 75. The applied alternating voltage is kept constant. It should be noted that the oscillator 71, the amplifiers 72, 74, the band-pass filter 73 and the controlling section 75 may be mounted on the circuit board 29 enclosed in the enclosure 12, for example.

Figure 8:
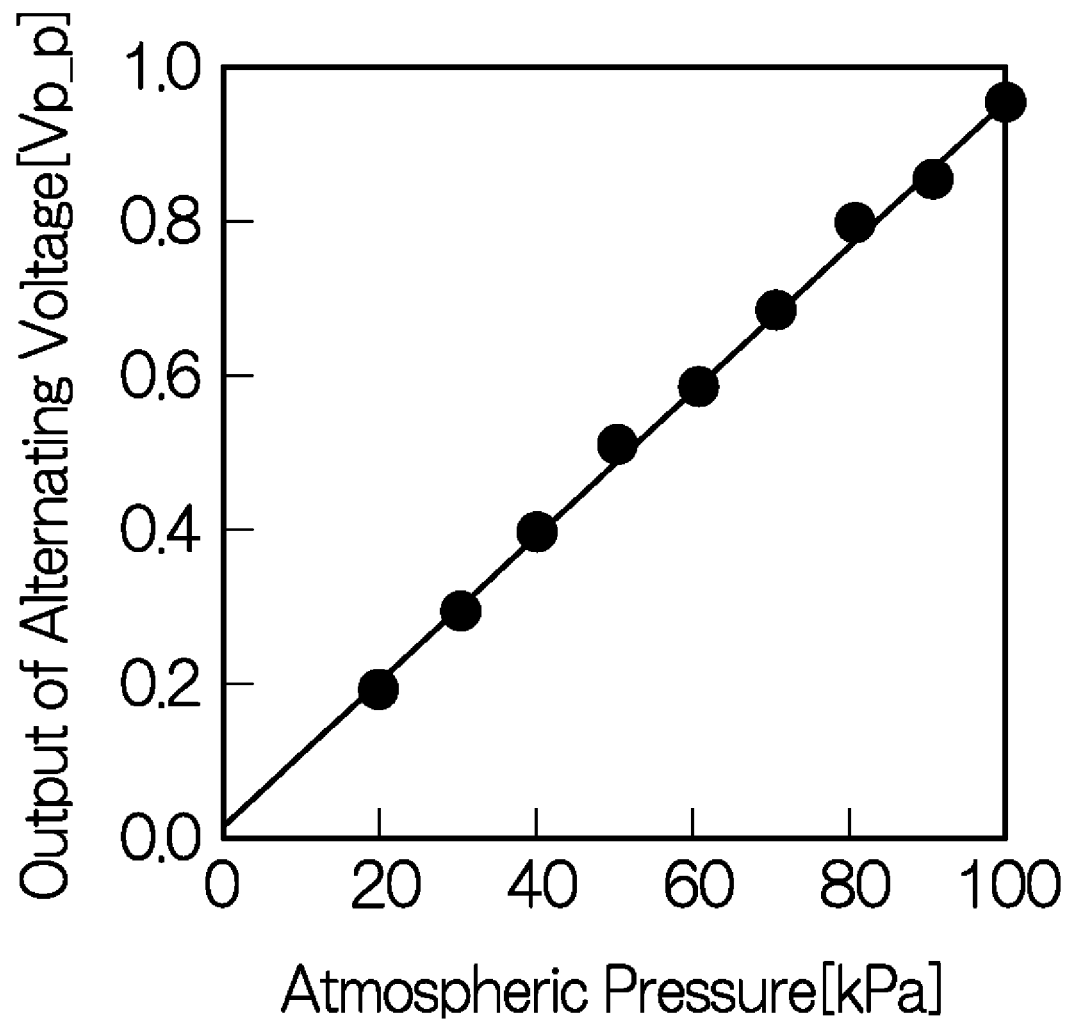
FIG. 8 is a graph illustrating a relationship between the output from the receiver and atmospheric pressure.

A memory 76 is connected to the controlling section 75. The memory 76 may be a nonvolatile memory. A predetermined table 77 is stored in the memory 76. The table 77 is utilized to specify the relationship between the intensity of the acoustic wave received at the microphone 58 and the atmospheric pressure. FIG. 8 is a graph representing the table 77 according to a specific embodiment. The y-axis of the graph denotes the output [$V_{p\_p}$] of the alternating voltage taken out from the microphone 58. An actual measurement was conducted to reveal the relationship between the output of the alternating voltage and the atmospheric pressure as shown in the graph. The alternating voltage of 3.0 [$V_{p\_p}$] was applied to the speaker 52 in the actual measurement. In practice a measurement may be carried out at the time of shipment of the hard disk drive 11 from a factory, for example. It should be noted that the measurement may not be limited within a range of the atmospheric pressure equal to or smaller than 100 [kPa]. The controlling section 75 refers to the table 77 so as to measure the level of the atmospheric pressure based on the alternating voltage output from the microphone 58.

A heater controlling section 78 is connected to the heater 47 of the flying head slider 22. The heater controlling section 78 is designed to supply a predetermined amount of electric power to the heater 47. The heater 47 generates heat in response to the supply of the electric power. The amount of the electric power determines the temperature of the heater 47. Specifically, the amount of the protrusion is controlled by adjusting the amount of the electric power. The flying height FH is in this manner controlled. A flying height setting section 79 is connected to the heater controlling section 78. The flying height setting section 79 is designed to notify the heater controlling section 78 of the amount of the electric power. The heater controlling section 78 supplies the notified amount of electric power to the heater 47 in accordance with the instructions from the flying height setting section 79. It should be noted that a so-called zero calibration may be executed to specify the amount of electric power.

A flying height variation calculating section 81 is connected to the aforementioned controlling section 75. The controlling section 75 is designed to supply the specified atmospheric pressure to the flying height variation calculating section 81. The flying height variation calculating section 81 is designed to calculate a variation in the flying height FH of the electromagnetic transducer 33 based on the atmospheric pressure. The flying height variation calculating section 81 may refer to the relationship between the atmospheric pressure and variation in the flying height FH. The relationship may be figured out beforehand based on an actual measurement, a computer simulation, or the like. The relationship may be stored in a memory, not shown, in the hard disk drive 11. The calculated variation of the flying height FH is notified to the heater controlling section 78. The heater controlling section 78 adjusts the amount of the electric power supplied from the flying height setting section 79 in accordance with the calculated variation.

When the atmospheric pressure drops, for example, the air density decreases. The flying head slider 22 thus suffers from a reduction in the positive pressure acting on the flying head slider 22. This results in a reduction in the flying height FH of the electromagnetic transducer 33. The heater controlling section 78 correspondingly reduces the amount of the electric power supplied to the heater 47. The protrusion amount is thus reduced. When the atmospheric pressure increases, the air density increases. The flying head slider 22 thus suffers from an increase in the positive pressure acting on the flying head slider 22. This results in an increase in the flying height FH of the electromagnetic transducer 33. The heater controlling section 78 correspondingly increases the amount of the electric power supplied to the heater 47. The protrusion amount thus increases. In this manner, the flying height FH of the electromagnetic transducer is kept constant irrespective of a variation in the atmospheric pressure.

The hard disk drive 11 enables determination of the amount of the protrusion prior to the reading/writing operation of the magnetic bit data. The atmospheric pressure inside the enclosure 12 is measured to determine the protrusion amount. The atmospheric pressure sensor 24 measures the atmospheric pressure as described above. The result of the measurement is supplied to the flying height variation calculating section 81. The flying height variation calculating section 81 calculates a variation in the flying height FH of the electromagnetic transducer 33 based on the atmospheric pressure. The heater controlling section 78 adjusts the amount of the electric power supplied to the heater 47 in accordance with the calculated variation. The protrusion amount is in this manner determined for the reading/writing operation of the magnetic bit data. When the protrusion amount has been determined, the electromagnetic transducer 33 is allowed to fly above the surface of the magnetic recording disk 13 at a predetermined flying height FH. The protrusion amount may be adjusted every time when the hard disk drive 11 is booted up, for example.

The controlling section 75 supplies the instruction signal to the oscillator 71 for the application of the alternating voltage in detection of the atmospheric pressure. The oscillator 71 applies a predetermined alternating voltage to the piezoelectric material 54 in response to the reception of the instruction signal from the controlling section 75. The shrinkage/elongation of the piezoelectric material 54 thus occurs in response to the application of the alternating voltage. The shrinkage/elongation of the piezoelectric material 54 induces the vibration of the diaphragm 53. An acoustic wave is thus transmitted to the microphone 58. Air propagates the acoustic wave. When the microphone 58 receives the acoustic wave, the diaphragm 59 vibrates. The shrinkage/elongation of the piezoelectric material 61 thus occurs. A predetermined alternating voltage is generated in the piezoelectric material 61 in response to the vibration of the diaphragm 59. The predetermined alternating voltage is taken out from the microphone 58. The noise of the alternating voltage is eliminated through the band-pass filter 73. The alternating voltage is output to the controlling section 75. The controlling section 75 calculates the atmospheric pressure in accordance with the relationship specified in the table 77 as described above.

The atmospheric pressure sensor 24 is incorporated in the hard disk drive 11. Acoustic wave is transmitted between the speaker 52 and the microphone 58 in the atmospheric pressure sensor 24. Since the intensity of the acoustic wave reflects a variation in the atmospheric pressure, the atmospheric pressure can be measured based on the intensity of the acoustic wave received at the microphone 58. In this manner, the atmospheric pressure can easily be measured with a simplified structure. Moreover, a variation in the flying height FH of the electromagnetic transducer 33 is calculated based on the atmospheric pressure. The amount of the protrusion of the flying head slider 22 is controlled in accordance with the detected variation in the flying height FH. The flying height FH of the electromagnetic transducer 33 can thus be kept constant irrespective of a variation in the atmospheric pressure. Magnetic bit data can be read/written with high accuracy.

Figure 9:
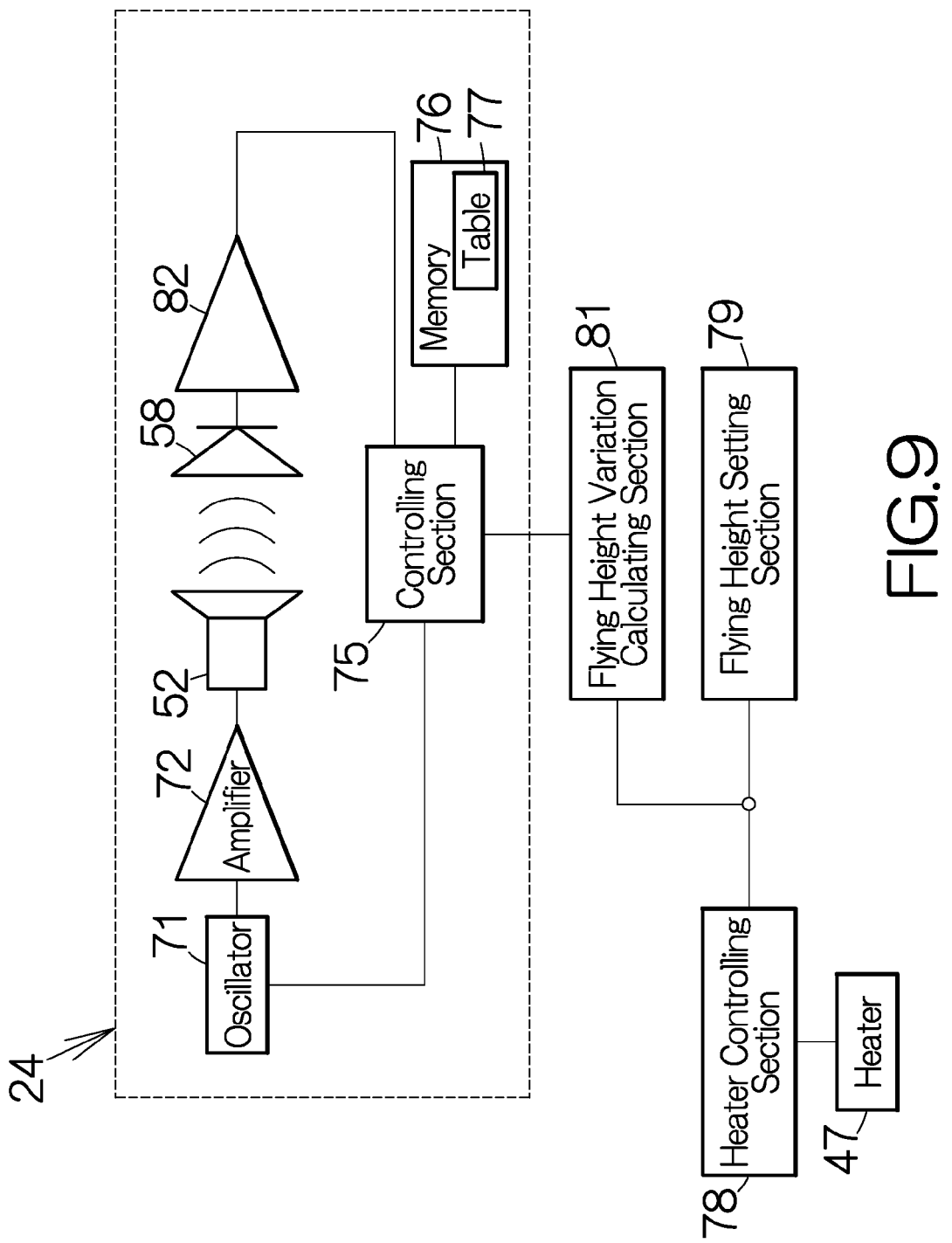
FIG. 9 is a block diagram illustrating a controlling system according to another embodiment.

As shown in FIG. 9, a lock-in amplifier 82 may be incorporated in the aforementioned atmospheric pressure sensor 24 in place of the amplifier 74 and the band-pass filter 73. The lock-in amplifier 82 serves to extract a predetermined frequency component out of the alternating voltage output from the microphone 58. The predetermined frequency component has a frequency corresponding to the frequency set at the oscillator 71. In this case, a synchronization signal may be supplied to the lock-in amplifier 82 from the oscillator 71. When the lock-in amplifier 82 in this manner extracts the predetermined frequency component based on the synchronization signal, the other acoustic waves having the other frequencies in the enclosure 12 is prevented from affecting the measurement of the atmospheric pressure. The intensity of a target acoustic wave is detected with accuracy. The atmospheric pressure is thus detected with a higher accuracy.

Figure 10:
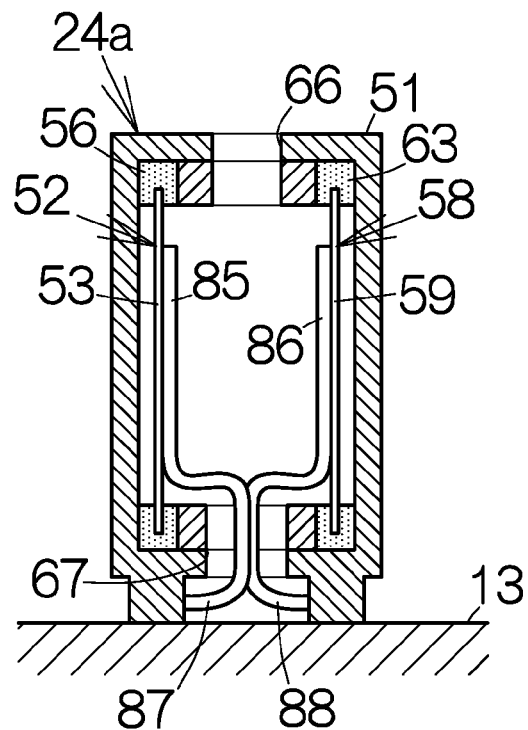
FIG. 10 is a sectional view schematically illustrating an atmospheric pressure measuring apparatus according to another embodiment of the present invention.

FIG. 10 schematically illustrates an atmospheric pressure sensor 24a according to another embodiment of the present invention. So-called piezoelectric films 85, 86 are superposed on and bonded to the diaphragms 53, 59, respectively, in the atmospheric pressure sensor 24a. The piezoelectric films 85, 86 are each formed in the shape of a disk in the same manner as the aforementioned piezoelectric materials 54, 61. Wirings 87, 88 are connected to the piezoelectric films 85, 86, respectively. Alternating voltage is applied to the piezoelectric film 85 through the wiring 87. Alternating voltage is taken out from the piezoelectric film 86 through the wiring 88. Like reference numerals are attached to the structure or components equivalent to those of the aforementioned atmospheric pressure sensor 24.

Figure 11:
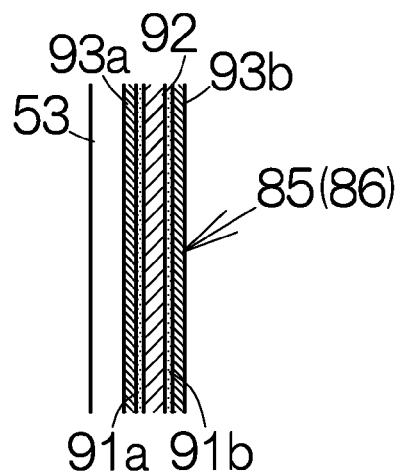
FIG. 11 is an enlarged partial sectional view schematically illustrating a piezoelectric film.

As shown in FIG. 11, the piezoelectric film 85 includes a piezoelectric material 92 interposed between electrodes 91a, 91b. The piezoelectric material 92 is made of polyvinylidene fluoride resin (PVDF), for example. Insulating films 93a, 93b are bonded to the surfaces of the electrodes 91a, 91b, respectively. The insulating film 93a of the piezoelectric film 85 is bonded to the front surface of the diaphragm 53, for example. Alternating voltage is applied to the electrodes 91a, 91b through the aforementioned wiring 87. The diaphragm 53 is thus caused to vibrate. It should be noted that the structure of the piezoelectric film 86 is identical to the structure of the piezoelectric film 85. The atmospheric pressure sensor 24a is allowed to enjoy the advantages identical to those obtained in the aforementioned atmospheric pressure sensor 24.

Figure 12:
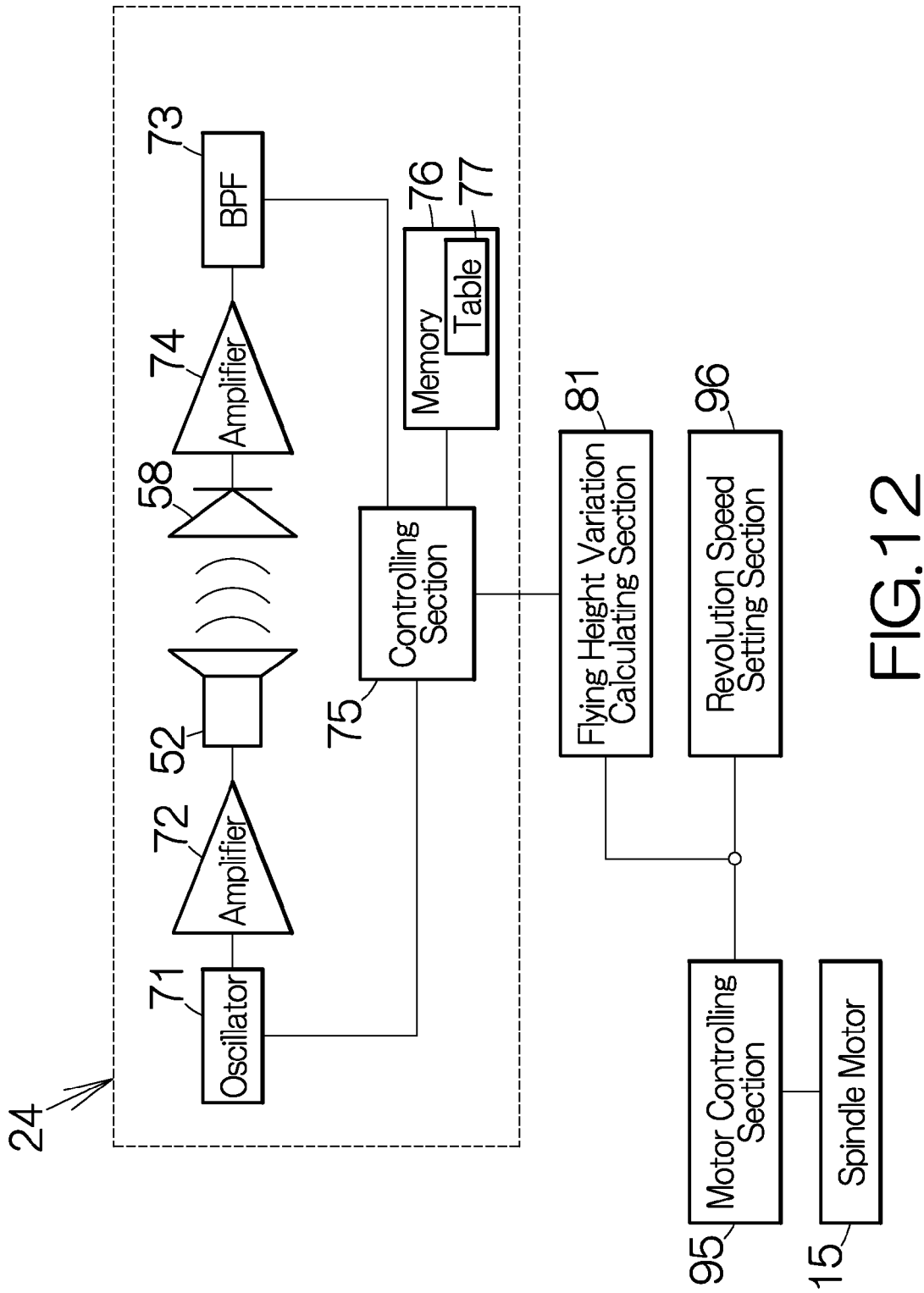
FIG. 12 is a block diagram illustrating a controlling system according to still another embodiment.

As shown in FIG. 12, a motor controlling section 95 is connected to the spindle motor 15 in the hard disk drive 11. The motor controlling section 95 is designed to supply a predetermined amount of electric power to the spindle motor 15. The spindle motor 15 induces the rotation of the magnetic recording disk or disks 14 in response to the supply of the electric power. The amount of the electric power determines the revolution speed of the spindle motor 15. A revolution speed setting section 96 is connected to the motor controlling section 95. The revolution speed setting section 96 is designed to set the amount of the electric power notified to the motor controlling section 95. The motor controlling section 95 supplies the electric power of the notified amount to the spindle motor 15. The revolution speed of the spindle motor 15 is kept constant. The aforementioned flying height variation calculating section 81 is connected to the controlling section 75. The flying height variation calculating section 81 output a notification of the amount of variation to the motor controlling section 95. The motor controlling section 95 adjusts the amount of the electric power output from the revolution speed setting section 96. Like reference numerals are attached to the structure or components equivalent to those of the aforementioned embodiment.

When the atmospheric pressure drops, the electromagnetic transducer 33 is forced to suffer from a reduction in the flying height FH. In this case, the motor controlling section 95 operates to increase the electric power in accordance with the amount of the variation in the flying height FH. The revolution speed of the magnetic recording disk 14 thus increases. This results in an increase in the current of the airflow generated along the front and back surfaces of the magnetic recording disk 14. The flying head slider 22 is thus allowed to enjoy an increase in the positive pressure acting on the flying head slider 22. The flying height FH of the electromagnetic transducer 33 is in this manner kept constant. When the atmospheric pressure increases, the electromagnetic transducer 33 is forced to suffer from an increase in the flying height FH. In this case, the motor controlling section 95 operates to decrease the electric power in accordance with the variation in the flying height FH. The revolution speed of the magnetic recording disk 14 thus decreases. This results in a reduction in the current of the airflow generated along the front and back surfaces of the magnetic recording disk 14. The flying head slider 22 is thus allowed to enjoy a decrease in the positive pressure acting on the flying head slider 22. The flying height FH of the electromagnetic transducer 33 is in this manner kept constant.

The hard disk drive 11 may accept omission of the bandpass filter 73, shown in FIGS. 7 and 12, if only a smaller amount of noise is included in the alternating voltage output from the microphone 58, for example. The lock-in amplifier 82, shown in FIG. 9, may be replaced with the amplifier 74, for example. The atmospheric pressure sensor 24*a* may be employed in combination with the control of the revolution speed of the magnetic recording disk or disks 14. The aforementioned atmospheric pressure sensors 24, 24*a* may be incorporated in any kind of storage medium drive, storage device or electronic apparatus other than the aforementioned hard disk drive 11 for the purpose of detecting an atmospheric pressure. Alternatively, the aforementioned atmospheric pressure sensors 24, 24*a* may be utilized alone.

What is claimed is:

1. A storage device comprising: an enclosure;
   a storage medium incorporated in an inner space of the enclosure;
   a head slider opposed to a surface of the storage medium at a distance; a head element mounted on the head slider;
   a transmitter incorporated in the inner space of the enclosure, the transmitter designed to transmit an acoustic wave;
   a receiver incorporated in the inner space of the enclosure, the receiver designed to receive the acoustic wave transmitted from the transmitter; and
   a controlling section designed to detect an atmospheric pressure based on intensity of the acoustic wave received at the receiver, the controlling section designed to control a flying height of the head element in accordance with the atmospheric pressure detected.

2. A method of controlling a flying height, comprising:
   transmitting an acoustic wave from a transmitter incorporated in an inner space of an enclosure of a storage device;
   receiving the acoustic wave transmitted from the transmitter at a receiver incorporated in the inner space of the enclosure;
   detecting an atmospheric pressure inside the enclosure based on intensity of the acoustic wave received at the receiver; and
   adjusting a flying height of a head element mounted on a head slider above a storage medium in accordance with the atmospheric pressure detected.

3. The method according to claim 2, wherein the atmospheric pressure is detected in accordance with a relationship between atmospheric pressure and ratio of the intensity of the acoustic wave, received at the receiver, to intensity of the acoustic wave transmitted from the transmitter.

4. The method according to claim 2, wherein a frequency of the acoustic wave coincides with a resonant frequency of at least one of the
   transmitter and the receiver.

5. The method according to claim 2, wherein the transmitter and the receiver are opposed to each other at a distance equal to a half wavelength of the acoustic wave transmitted from the transmitter, multiplied by an integer.

* * * * *